United States Patent
Lee et al.

(10) Patent No.: US 7,691,516 B2
(45) Date of Patent: Apr. 6, 2010

(54) FUEL CELL SYSTEM AND STACK USED THEREIN

(75) Inventors: Dong-Hun Lee, Suwon-si (KR); Ho-Jin Kweon, Suwon-si (KR); Hyoung-Juhn Kim, Suwon-si (KR); Seong-Jin An, Suwon-si (KR); Jun-Won Suh, Suwon-si (KR); Jong-Man Kim, Suwon-si (KR); Hae-Kwon Yoon, Suwon-si (KR); Sung-Yong Cho, Suwon-si (KR); Yeong-Chan Eun, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1224 days.

(21) Appl. No.: 11/066,658

(22) Filed: Feb. 25, 2005

(65) Prior Publication Data

US 2005/0196651 A1 Sep. 8, 2005

(30) Foreign Application Priority Data

Feb. 25, 2004 (KR) ............... 10-2004-0012649
Mar. 25, 2004 (KR) ............... 10-2004-0020359

(51) Int. Cl.
*H01M 2/00* (2006.01)
(52) U.S. Cl. ..................................... 429/34
(58) Field of Classification Search ............ 429/30, 429/34, 35, 36, 38, 12
See application file for complete search history.

(56) References Cited

U.S. PATENT DOCUMENTS

2004/0058223 A1* 3/2004 Shibata et al. ............ 429/38

FOREIGN PATENT DOCUMENTS

| | | |
|---|---|---|
| JP | 2003-157887 | 5/2003 |
| JP | 2003-163015 | 6/2003 |
| JP | 2004-6280 | 1/2004 |
| KR | 2003-0031849 | 4/2003 |

OTHER PUBLICATIONS

Korean Patent Abstracts for Publication No. 1020030031849; Date of publication of application Apr. 23, 2003, in the name of S. Kobayashi et al.
Patent abstract of Japan for publication No. 2003-157887; dated May 30, 2003 in the name of Yoshiaki Enami.
Patent abstract of Japan for publication No. 2003-163015; dated Jun. 6, 2003 in the name of Hiroki Kusakabe et al.
Patent abstract of Japan for publication No. 2004-006280; dated Jan. 8, 2004 in the name of Kazuhito Hado et al.

* cited by examiner

*Primary Examiner*—Patrick Ryan
*Assistant Examiner*—Monique Wills
(74) *Attorney, Agent, or Firm*—Christie, Parker & Hale, LLP

(57) ABSTRACT

A fuel cell system optimizing the ratio of width of a channel to a width of a rib forming a passage for supplying fuel and air, the ratio of width thereof to a height of a channel, and the number of passages, thereby improving the fuel diffusing performance and reducing a pressure drop therein is provided. The fuel cell system includes at least one stack for generating electrical energy by an electrochemical reaction between hydrogen and oxygen, a fuel supply portion for supplying fuel to the stack, and an oxygen supply portion for supplying oxygen to the stack. The stack is formed into a stacked configuration having a plurality of membrane electrode assemblies separated by separators. The separators have ribs which closely contact the adjacent membrane electrode assemblies and form channels through which the oxygen and hydrogen flow. The ratio of the width of a channel to the height of the same is between about 0.6 and about 0.8.

3 Claims, 6 Drawing Sheets

FUEL CELL SYSTEM AND STACK USED THEREIN

CROSS REFERENCE TO RELATED APPLICATION

This application claims priority to and the benefit of Korean Patent Applications Nos. 10-2004-0012649 and 10-2004-0020359 filed respectively on Feb. 25 and Mar. 25, 2004 in the Korean Intellectual Property Office, the contents of which are incorporated herein by reference.

FIELD OF THE INVENTION

The present invention relates to a fuel cell system and a stack used therein, and more particularly, to a fuel cell system and a stack used therein to enhance the efficiency of the fuel cell by optimizing the size and the number of passages formed between separators (or bipolar plates) and the membrane electrode assembly (herein referred to as MEA).

BACKGROUND OF THE INVENTION

A fuel cell is a system for producing electric power. In the fuel cell, chemical reaction energy between oxygen and hydrogen contained in hydrocarbon-group materials (e.g., methanol, natural gas) is directly converted into electric energy. Such a fuel cell is characterized by the production of electric energy and thermal energy as a by-product of an electrochemical reaction occurring without combustion.

Depending on the type of electrolyte used in a fuel cell, the fuel cell may be classified into one of many different types of fuel cells, for example, phosphate fuel cells, molten carbonate fuel cells, solid oxide fuel cells, and polymer electrolyte or alkali fuel cells. Although each of these different types of fuel cells operate using the same principles, they differ in the type of fuel, catalyst, and electrolyte used, as well as in drive temperature.

A polymer electrolyte membrane fuel cell (PEMFC) has been developed recently. Compared to other fuel cells, the PEMFC has excellent output characteristics, a low operating temperature, and fast starting and response characteristics. The PEMFC may be used for vehicles, in the home and in buildings, and for the power source in electronic devices. The PEMFC, therefore, has a wide range of applications.

The basic components of the PEMFC are a stack, a fuel tank, and a fuel pump. The stack forms the main body of the fuel cell. The fuel pump supplies to the stack fuel reserved in the fuel tank. A reformer may also be used to reform the fuel to create relatively pure hydrogen gas and to supply the hydrogen gas to the stack.

In the PEMFC, the fuel pump operates to send the fuel from the fuel tank to the reformer. The fuel is reformed in the reformer to generate hydrogen gas, and the hydrogen gas is chemically reacted with oxygen in the stack to generate electric energy.

Fuel cells using direct methanol fuel cells (herein referred to as "DMFC") supply liquid methanol fuel containing hydrogen directly to the stack and therefore would not include a reformer. This lack of a reformer is the difference between the PEMFC and DMFC.

FIG. 7 is a partial cross section of a stack used in a fuel cell system according to the prior art where MEAs are assembled with separators. The stack may be composed of a structure of stacked unit cells. The stacked unit cells may contain a few unit cells, or ten or more unit cells having MEAs 51 and separators 53a, 53b.

The MEAs 51 have an electrolyte membrane, and an anode electrode and a cathode electrode mounted on opposite surfaces thereof. The separators 53a, 53b have respective passages 55, 57 through which the hydrogen gas and/or air needed for the oxidation/reduction reaction of the MEAs 51 is supplied to the anode electrode and the cathode electrode. That is, the hydrogen gas is supplied to the anode electrode and the air is supplied to the cathode electrode through passages 55, 57, respectively, of the separators 53a, 53b. In this process, the hydrogen gas oxidizes at the anode electrode and the oxygen reduces at the cathode electrode. The flow of electrons generated during this operation creates a current. In addition, water and heat are generated by the electrochemical reactions.

In more detail, each separator 53a, 53b includes plurality of ribs 59 closely faced against the adjacent surfaces of MEAs which define the passages 55, 57 for supplying the hydrogen gas and air needed. Substantially, the passages are interposed between each of the ribs 59.

Typically, where separators are positioned on both sides of MEAs 51, the passages 55, 57 for supplying each of the hydrogen gas and air needed are orthogonal to each other. Thus, in the cross section illustrated in FIG. 7, a single passage 55 for supplying the hydrogen gas is illustrated while a plurality of passages 57 for supplying air are illustrated.

In the fuel cell system described above, the structure of a stack should enhance the diffusing performance in the stack while maintaining the pressure of the fuel during diffusion in order to enhance the efficiency of the fuel cell. Here, one important condition for designing the structure of a stack is the size and the number of the passages 55, 57. That is, in the separators 53a, 53b, the size and the number of passages 55, 77 plays an important role in diffusing hydrogen gas and air to diffusing layers thereof from the active area of the MEA 51, and also for handling the contact resistance of current generated in the MEA 51.

SUMMARY OF THE INVENTION

In one aspect of the present invention, there is provided a fuel cell system optimizing the ratio of width of a channel and a rib forming the passage for supplying fuel and air, the ratio of width thereof to height of a channel, and the number of the passages, thereby improving the fuel diffusing performance and reducing the pressure dropping therein.

In an exemplary embodiment of the present invention, a fuel cell system includes at least one stack for generating electrical energy by an electrochemical reaction between hydrogen and oxygen; a fuel supply portion for supplying fuel to the stack; and an oxygen supply portion for supplying oxygen to the stack. The stack is formed into a stacked configuration with a plurality of MEAs separated by separators. The separators have ribs which closely contact adjacent MEAs and form channels through which the oxygen and hydrogen flow. The rib corresponds to a portion contacted closely with the adjacent MEAs, and the channel corresponds to a portion separated from the adjacent MEAs.

The ratio of the width of a channel to the height of the same is between about 0.6 and about 0.8.

The width of a channel may be between about 0.9 and about 1.1 mm, the ratio of the width of a channel to the width of a corresponding rib may be between about 1.1 and about 1.3, and the number of channels may be three.

The width of a channel may be between about 1.1 and about 1.3 mm, the ratio of the width of a channel to the width of a corresponding rib may be between about 0.7 and about 0.9, and the number of channels may be five.

The width of a channel may be between about 1.1 and about 1.3 mm, the ratio of the width of a channel to the width of a corresponding rib may be between about 1.1 and about 1.3, and the number of channels may be four.

In an embodiment of the invention, an active area of MEAs is 40 cm$^2$ and the number of passages is from three to six.

DETAILED DESCRIPTION

Figure 1:
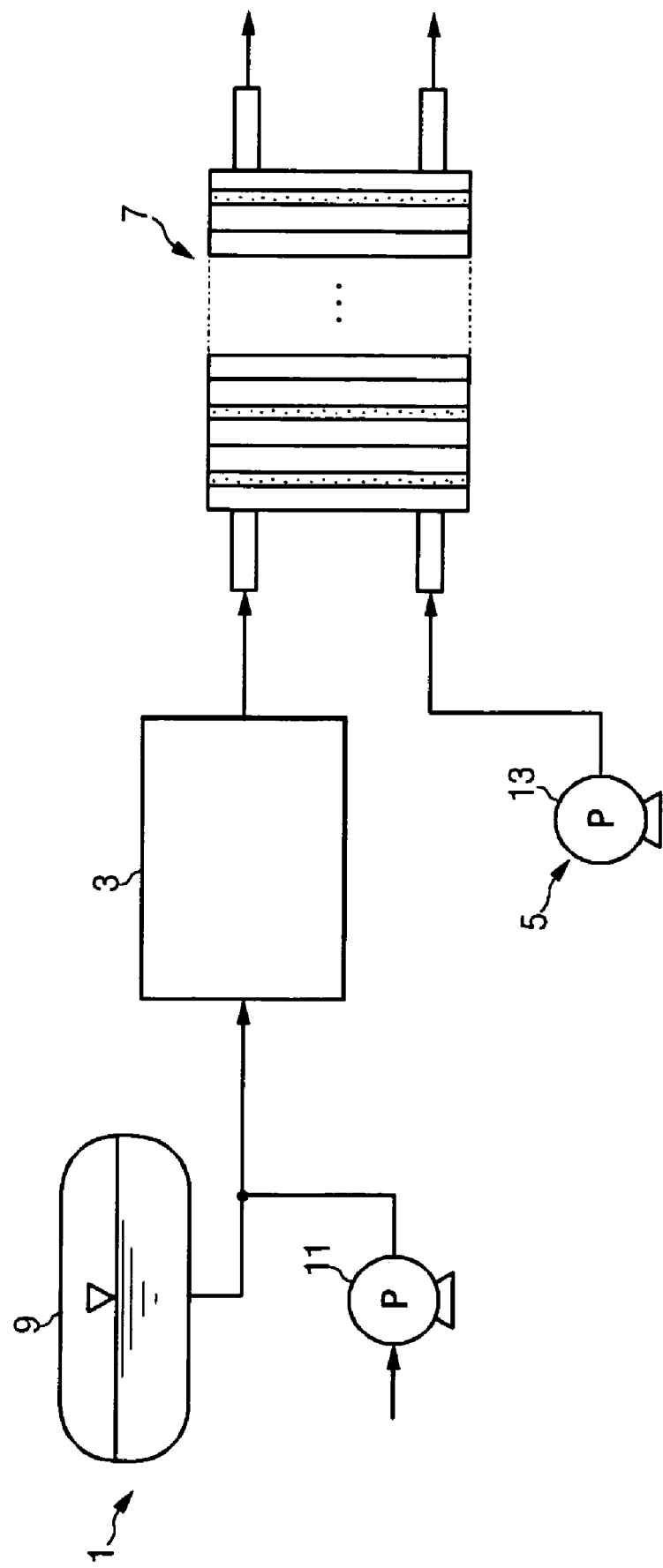
FIG. 1 is a schematic diagram of a fuel cell system according to an exemplary embodiment of the present invention.
Figure 2:
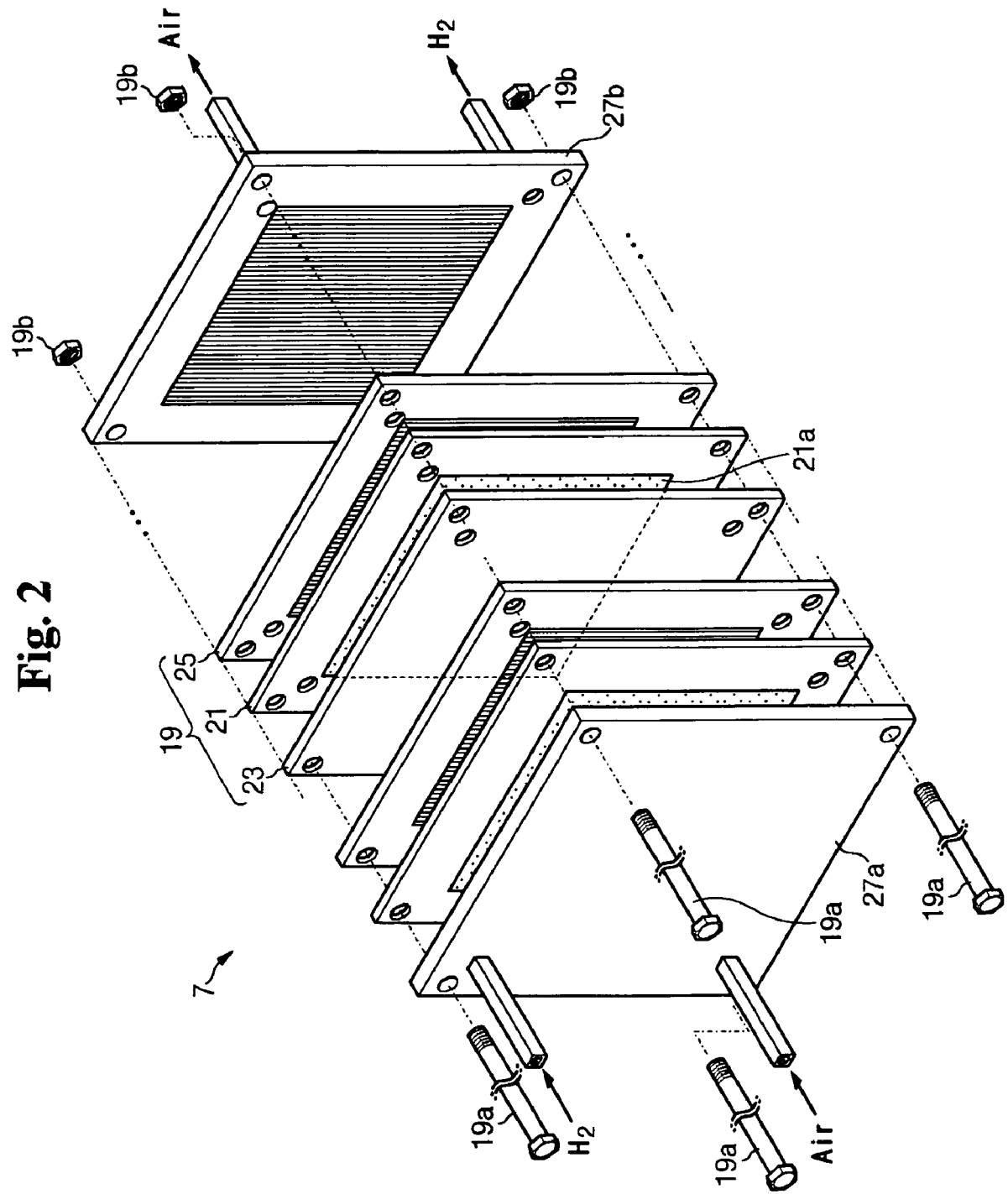
FIG. 2 is an exploded perspective view of a stack of FIG. 1.

Referring to FIGS. 1 and 2, in an embodiment of the invention, a fuel cell system includes a fuel supply portion 1 for supplying fuel to a reformer 3. Hydrogen gas generated from the supplied fuel in the reformer 3 is provided to the stack 7. In addition, an oxygen supply portion 5 supplies air to the stack 7. In the stack 7, the chemical reaction energy of the hydrogen gas and oxygen contained in air is converted into electrical energy to thereby generate electricity.

A fuel supply assembly 1 includes a fuel tank 9 and a pump 11. Fuel may be stored in the fuel tank 9. The fuel used in some embodiments may be a liquid fuel, for example methanol or ethanol, or it may be a gaseous fuel such as natural gas. In this embodiment, the pump 11 provides liquid fuel to a reformer 3 where hydrogen gas is generated. The hydrogen gas then flows into the stack 7.

In an embodiment of a fuel cell system, a liquid fuel containing hydrogen may be directly supplied to the stack 7 as in a DMFC system. In the following, however, it will be assumed that the fuel cell system applies to the PEMFC type system.

Figure 3:
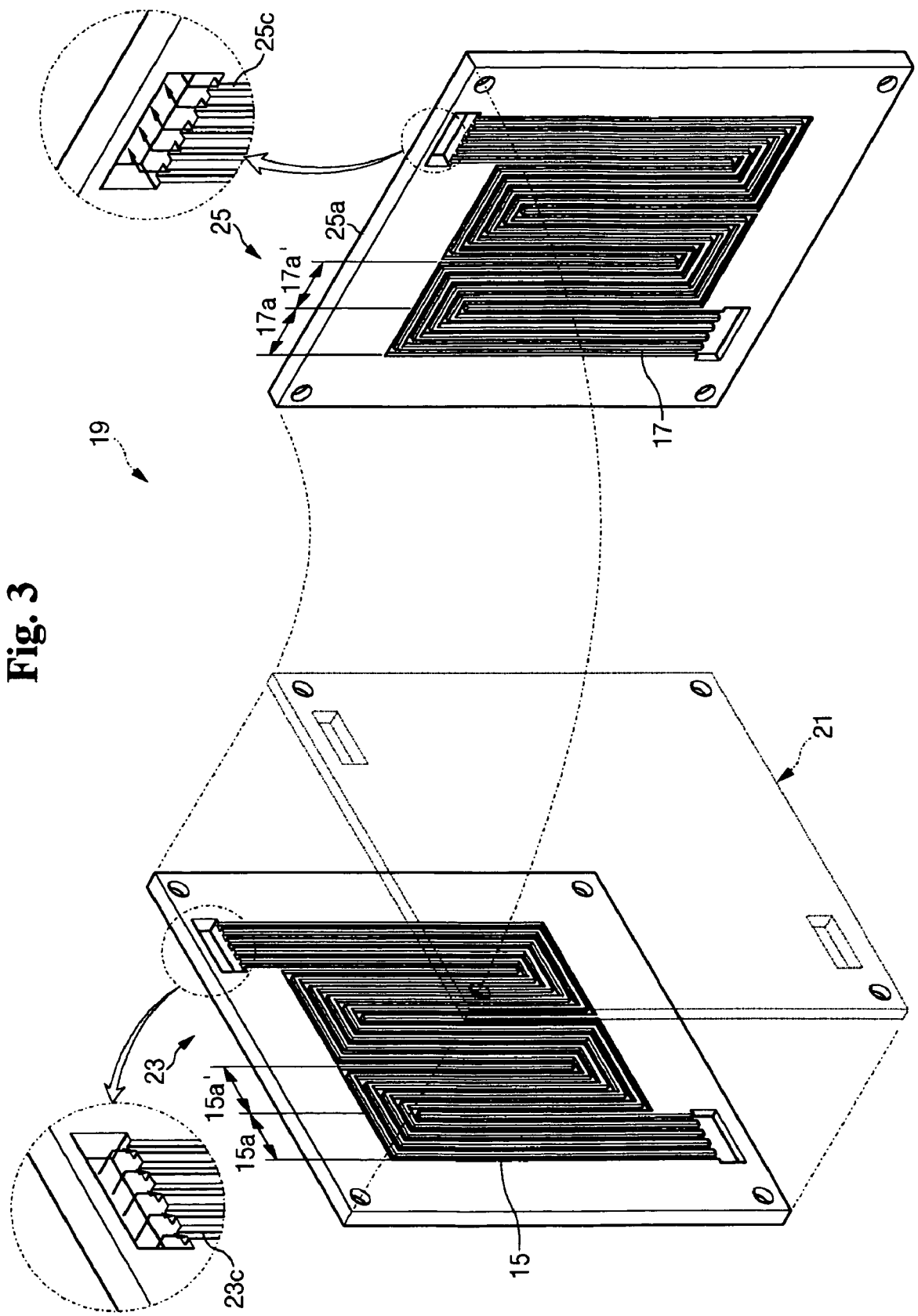
FIG. 3 is an exploded perspective view of a unit cell composing a stack of FIG. 1.

Referring to FIGS. 1 and 3, an air supply portion 5 includes an air pump 13 for providing air to the stack 7. In the stack 7, air flows through air passages 17, and hydrogen gas flows through hydrogen passages 15.

As shown in FIG. 1, hydrogen gas is supplied to the stack 7 through the fuel supply portion 1 and from the reformer 3. Air is supplied to the stack 7 through air supply portion 5. Electrical energy is generated through an electrochemical reaction between hydrogen gas and oxygen present in the external air. In addition, heat and water are generated.

FIG. 3 illustrates a stack 7 having at least one unit cell 19 for generating electrical energy through an oxidation/reduction reaction of hydrogen gas generated by the reformer 3 with oxygen contained in the air. Each unit cell 19 forms a minimum unit cell for generating electricity by interposing an MEA 21 between two separators 23, 25. FIG. 2 depicts a plurality of such unit cells 19 combined to form the stack 7 of an embodiment having a stacked configuration. End plates 27a, 27b are mounted to opposite outermost layers of a plurality of unit cells 19. The end plates 27a, 27b may be an alternative structure of separators 23, 25. A plurality of unit cells 19 are combined by means of fastening bolts 19a penetrating the outermost layers thereof and fastened with nuts 19b to form the stack 7 of a stacked configuration. The hydrogen and air inputs and outputs of each unit cell are interconnected to the respective common input and output ports of the input and output end plates.

Figure 4:
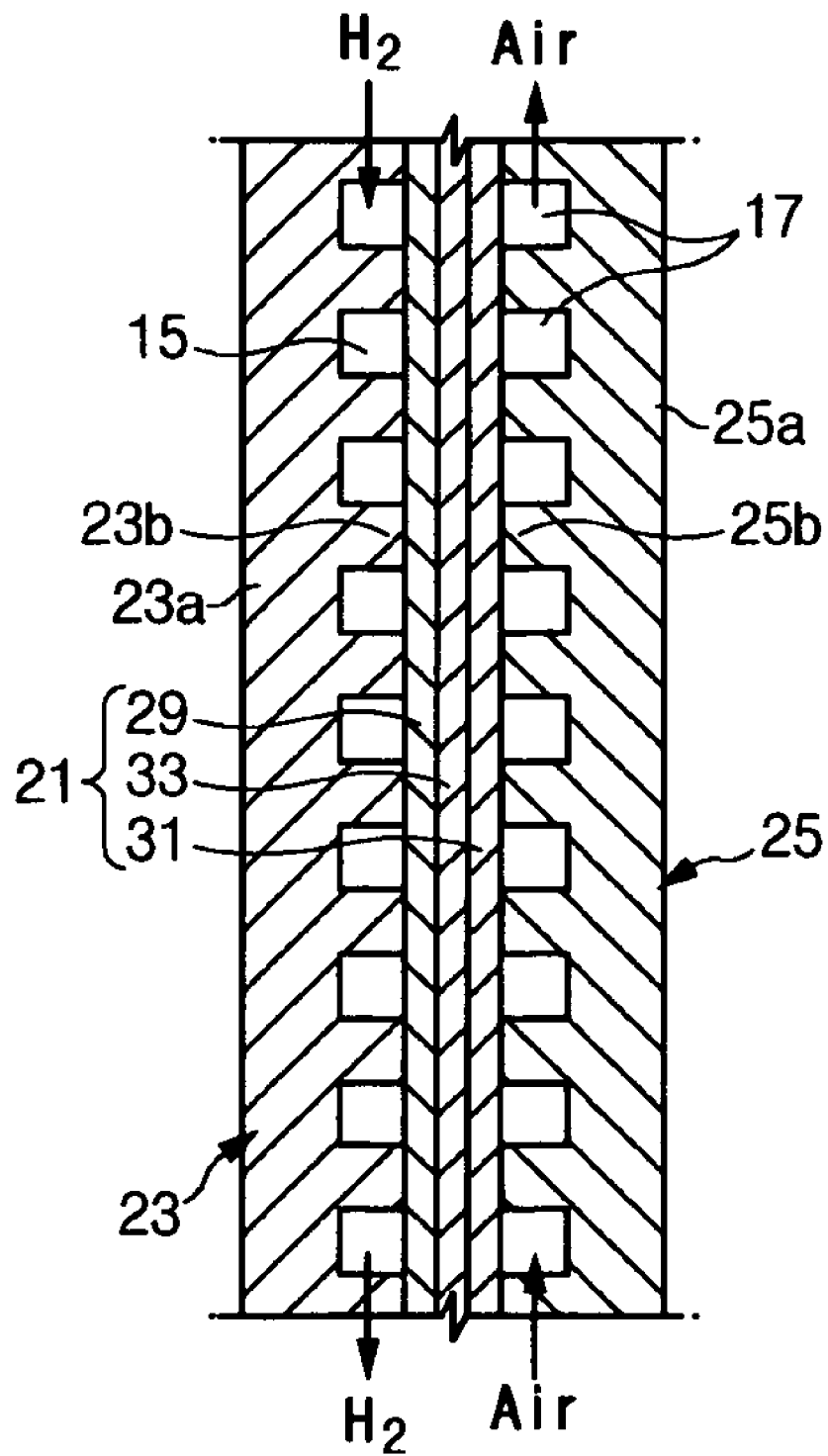
FIG. 4 is a partial cross section of a stack of FIG. 1, where an MEA is assembled with separators.

With reference now to FIGS. 3 and 4, each of the separators 23, 25 is positioned proximate to a surface of an MEA 21 to form hydrogen passages 15 and air passages 17 between separators 23, 25 and the surface of MEAs 21. The hydrogen passage 15 is adjacent to an anode electrode 29 of the MEA 21. The air passage 17 is adjacent to a cathode electrode 31 of the MEA 21. The hydrogen passage 15 and the air passage 17 may be formed with ribs 23b, 25b protruded from the body 23a, 25a of separators 23, 25, and channels 23c, 25c formed between two ribs 23b, 25b.

The above-structured plurality of passages 15, 17 come together to form a set 15a, 17a, and the passages 15, 17 of the set 15a, 17a respectively communicate with corresponding passages of the next set 15a', 17a' neighboring thereto.

Such hydrogen passages 15 and oxygen passages 17 are formed longitudinally at each of the separators 23, 25 when each of the separators 23, 25 contact closely with either surface of the MEA 21 (shown in FIG. 3).

In more detail, each of these hydrogen passages 15 alternately winds either downward or upward such that hydrogen gas inflows from the inlet of these hydrogen passages 15 formed at the upper part of the separator 23 and outflows toward the outlet formed at the lower part thereof. Meanwhile, each of the oxygen passages 17 alternately winds opposite to the direction of each of the hydrogen passages 15 such that oxygen gas inflows from the inlet of these oxygen passages 17 formed at the lower part of the separator 23 and outflows toward the outlet formed at the upper part thereof. That is, such hydrogen passages 15 and corresponding oxygen passages 17 are arranged with respect to each other such that the hydrogen gas flow direction is the reverse of the flowing direction of the oxygen gas. However, forming directions of such hydrogen passages 15 and corresponding oxygen passages 17 may be configured differently.

The MEA 21 is interposed between a pair of separators 23, 25 which include an active area 21a (depicted in FIG. 2) with a predetermined size where the oxidation/reduction reaction occurs. The anode electrode 29 and cathode electrode 31 may be positioned on either side surface of the active area 21a or with the electrolyte membrane 33 interposed between the electrodes 29, 31.

In more detail, the hydrogen gas is supplied to the anode electrode 29 through the hydrogen passage 15 formed between the anode electrode 29 of the MEA 21 and the separator 23. The hydrogen gas is supplied to a gas diffusion layer to diffuse toward a catalyst layer. The catalyst layer promotes an oxidation reaction of hydrogen gas, and converted electrons are attracted outwardly so that current is generated by the flow of electrons. Hydrogen ions move to the cathode electrode 31 through the electrolyte membrane 33.

In addition, the oxygen contained in the air is supplied to the cathode electrode 31 through the oxygen passage 15 formed between the cathode electrode 31 of the MEA 21 and separators 25 closely contacting each other. As with the hydrogen, the oxygen is supplied to a gas diffusion layer to diffuse toward the catalyst layer. The catalyst layer promotes the conversion reaction of the hydrogen ions, electrons, and oxygen to produce electricity and water.

Further, the electrolyte membrane 33 is formed from solid polymer electrolyte and has a depth of 50 to 200 μm. Hydrogen ions generated in the catalyst layer of anode electrode 29 move through the electrolyte membrane 33 toward oxygen ions generated in the catalyst layer of the cathode electrode 31. The resultant ion exchange generates water.

With reference to FIG. 3 again, in the depicted exemplary embodiment there are a plurality of hydrogen passages 15 and a plurality of air passages 17, there may be a plurality of hydrogen passages 15 and one air passage 17 or a plurality of air passages 15 and one hydrogen passage 15. In addition, although in the depicted exemplary embodiment the number of hydrogen passages 15 is the same as that of the air passages 17, the number of these two passages 15, 17 respectively may be different.

Since these plurality of hydrogen passages 15 and plurality of air passages 17 of a set to form at the active area 21a will have a defined size due to the defined size of the active area 21a of the MEA 21, each of the plurality of hydrogen passages 15 and plurality of air passages 17 will have a smaller size, compared to passages 15, 17 with the same size formed at the active area of the same size.

Therefore, in an exemplary embodiment the number of the passages 15, 17 is set within a range to be physically formed in the separators 23, 25 of limited size so that the stack 7 has a similar power and a low pressure drop compared to a conventional stack having only one passage in a separator.

As a result, since there are a plurality of passages in the separator, the plurality of passages can have a shorter length compared to only a single passage formed in a separator of the same size so that the friction between inner wall of the passage and fluid is reduced on supplying hydrogen gas or air to reduce the pressure drop therein.

In an exemplary embodiment, the stack 7 is illustrated such that an active area of MEAs is below 40 cm$^2$ and five passages 15 for hydrogen and five passages 17 for air are formed in the separators 23, 25 to supply the hydrogen or air through the passages 15, 17 to the entire active area of the MEA 21.

With reference to Table 1 as described hereafter, when the number of the passages 15, 17 is set within 3 to 6, it can be seen that the fuel cell has a similar enhanced efficiency.

In more detail, the passage 15 may be composed such that it is formed singularly at the hydrogen inlet and outlet formed outside of the separator 23, and divided into a plurality of passages inside of the separator. Also, the passage 15 may be composed such that it is formed into a plurality of passages at both of the hydrogen inlet and outlet formed outside, and the inside of the separator 23.

In the same manner, the passage 17 may be composed such that it is formed singularly at the air inlet and outlet formed outside of the separator 25, and divided into a plurality of passages inside of the separator. Also, the passage 17 may be composed such that it is formed into a plurality of passages at both of the air inlet and outlet formed outside and the inside of the separator 25.

In this embodiment, the passage 15 for the hydrogen gas is illustrated such that it is formed singularly at the hydrogen inlet and outlet formed outside of the separator 23, and is divided into five regardless of the inside or outside of the separator.

The hydrogen passage 15 of the separator 23 is disposed adjacent to the anode electrode 29 of the MEA 21. The air passage 17 of the separator 25 is disposed adjacent to the cathode electrode 31 of the MEA 21. The hydrogen passage 15 is connected with the reformer 3, and the air passage 17 is connected with the pump 13. Accordingly, the rich hydrogen gas generated from the reformer 3 and the air pumped by the pump 3 are supplied to end plates 27 on opposite sides of a unit cell to allow the rich hydrogen gas to flow counter to the air. The balance of the hydrogen gas and air leaving after electrochemical reaction between the hydrogen gas and oxygen in air exhaust at the other end plate 27.

To enhance the efficiency of a fuel cell, it is desired that the power generation resistance occurring in the stack 7 be maintained within an allowable range having a separator with one passage. It is further desired that the gas diffusing layers of MEA 21 reduce a pressure drop across the stack 7. To achieve these goals, the number of passages 15, 17 should be appropriately controlled. In this embodiment, the number of passages 15, 17 is optimized to achieve this.

In order to enhance the diffusing performance of the hydrogen gas and air and the energy for supplying them to the stack, the RPD is used to test the performance of a fuel cell. The RPD is calculated by subtracting the value of the power consumed in the stack 7 from the value of the power generated in the stack 7, and then the resultant difference value is divided by the total area of the active area 21a. Such RPD values are shown in Tables 1 and 2.

[Table 1] shows the relationship of the number of passages with RPD.

TABLE 1

| | The number of passages | | | | | |
|---|---|---|---|---|---|---|
| | 1 | 2 | 3 | 4 | 5 | 6 |
| RPD(mW/cm$^2$) | 167 | 212 | 248 | 256 | 259 | 253 |

After the hydrogen gas is supplied to the anode electrode 29 and the oxygen gas is supplied to the cathode electrode 31, the RPD is calculated whenever the number of passages, that is, the passages 15, 17 for hydrogen and oxygen, is changed in a non-heated state. The results are illustrated in FIG. 5, which shows the relationship of the number of passages to the RPD.

Figure 5:
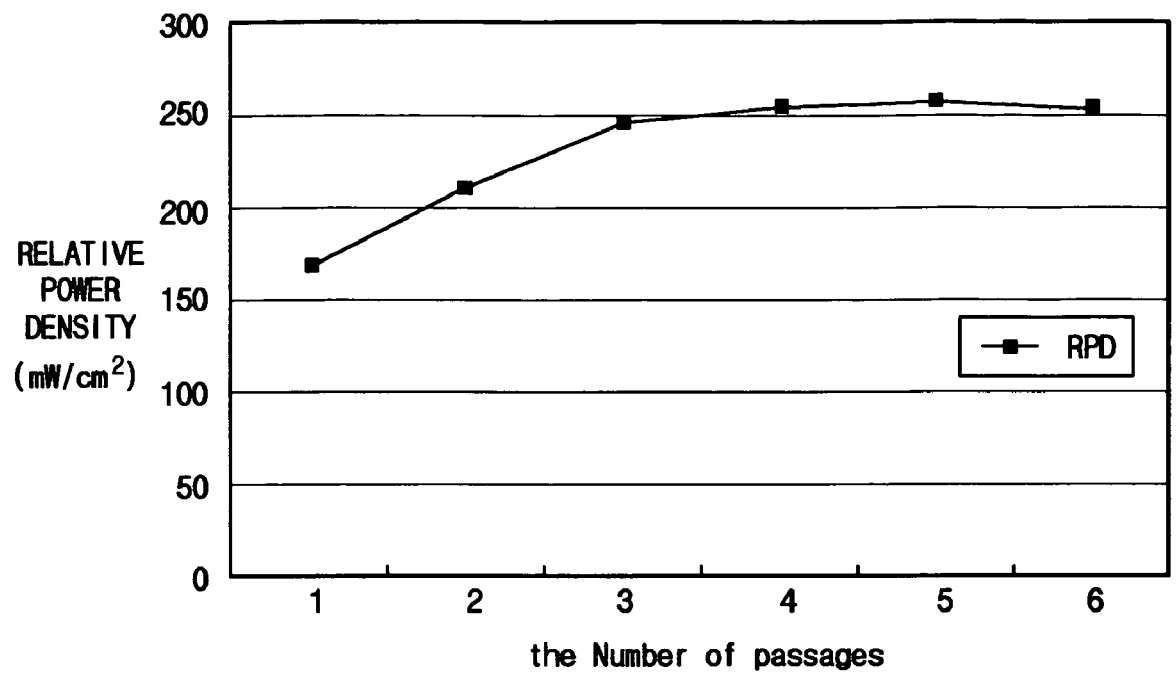
FIG. 5 is a graph illustrating the relationship of the number of passages with the relative power density (hereafter, referred to as "RPD").

With reference to FIG. 5, it is well known that when the number of each of the passages 15, 17 is one, the length of each of passages 15, 17 becomes longer so that the friction between the passage and the fluid is increased to generate a high pressure drop, thereby reducing RPD and the entire efficiency of fuel cell.

Also, it is well known that when the number of passages is increased to 2, 3, 4, and 5, the length of the passages 15, 17 become shorter so that the friction between the passage and the fluid is reduced to generate a low pressure drop thereby increasing RPD and the entire efficiency of the fuel cell. In addition, it is well known that when the number of passages is increased to 5, the overall efficiency of the fuel cell is the largest.

Further, it is well known that when the number of passages is six, the passages cannot be realized in the separators 23, 25 due to the limited size of the active area 21a of the MEA 21 being 40 cm$^2$, and when a fuel such as hydrogen or oxygen is not heated above a predetermined temperature, the entire efficiency of the fuel cell is reduced.

Now, referring to FIG. 6, the width of the passage formed between MEAs, the ratio of the width of the rib to the width of the passage, the ratio of the width of the passage to the height of the passage, the number of passages, and the efficiency of the fuel cell will be explained.

Figure 6:
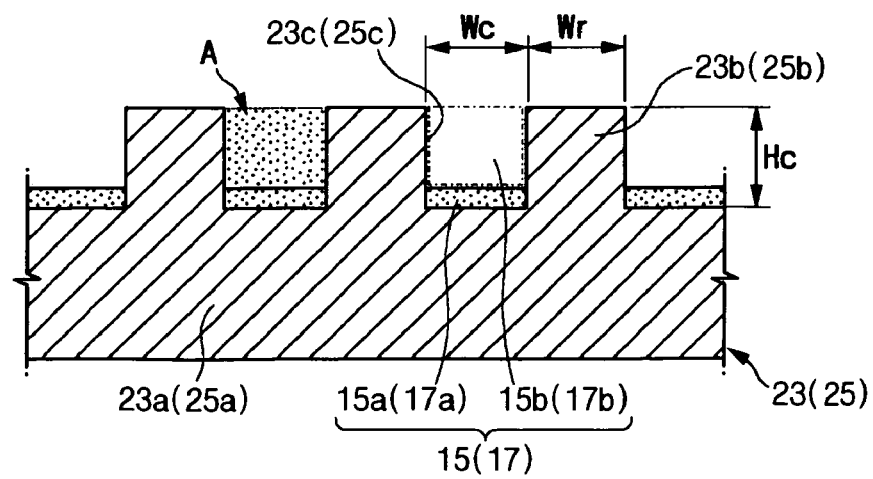
FIG. 6 is an exploded partial cross section of a separator of FIG. 1.
Figure 7:
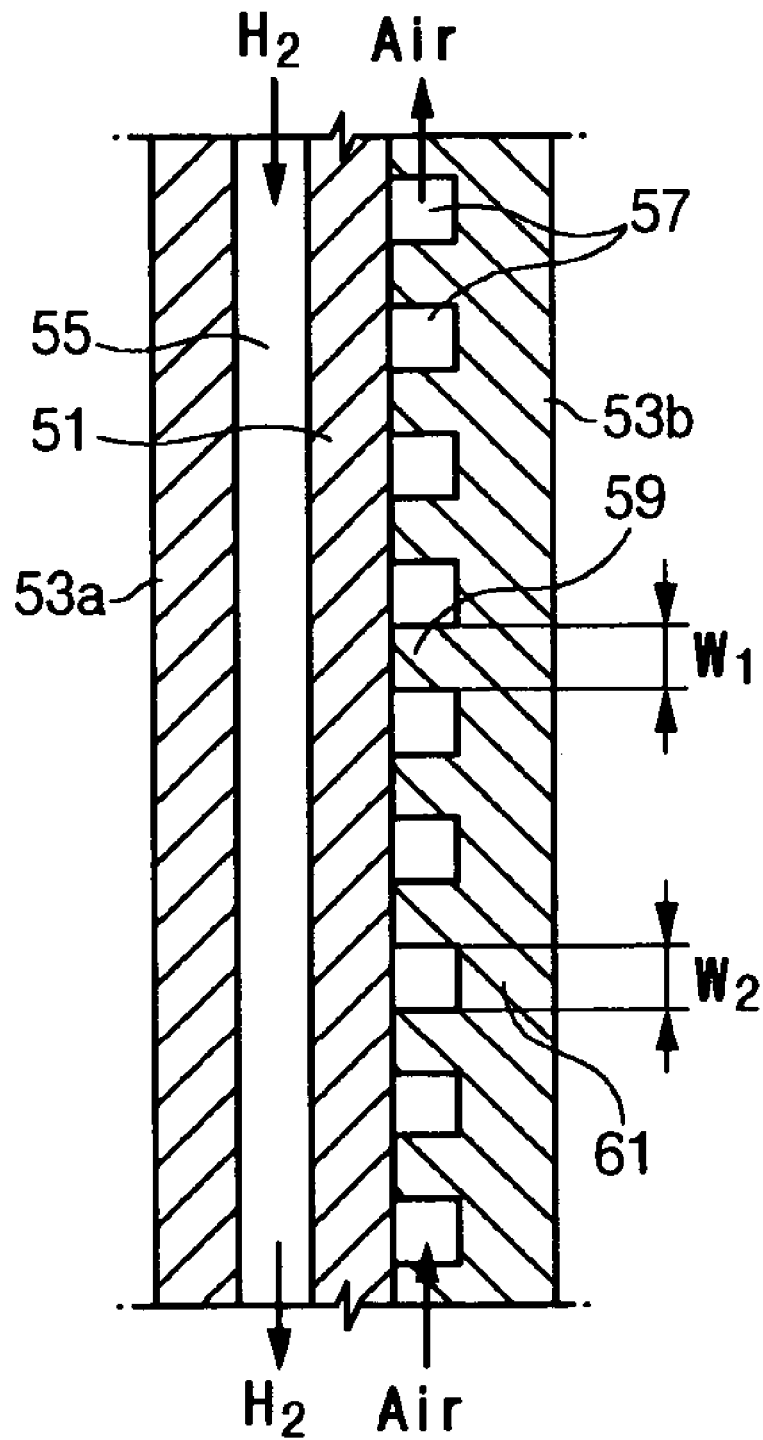
FIG. 7 is a partial cross section of stack used in a conventional fuel cell system, where MEAs are assembled with separators.

FIG. 6 is an enlarged partial cross section of a separator and depicts one separator 23, since the separators 23, 25 are structurally similar to each other. However, the following description may describe both separators 23, 25.

With reference to FIG. 6, the separators 23, 25 include a plurality of passages for supplying hydrogen gas and air needed for the oxidation/reduction reaction occurring at the electrodes 29, 31 of the EA 21, that is, the hydrogen passage 15 and oxygen passage 17 as described above.

Such a structure allows the size of the channels 23c, 25c to automatically set the size of the ribs 23b, 25b where a surface area of the active area 21a of the MEA 21 is set. In one embodiment, the cross-sectional area of the ribs 23b, 25b and channels 23c, 25c (the cross-sectional area taken along a vertical line in the longitudinal direction) may approximate a square. However, alternate geometries for the cross-sectional area may be used.

For example, the channels 23c, 25c may have a predetermined curvature at the bottom, or the channels 23c, 25c may be formed asymmetrically to the ribs 23b, 25b.

The channel 23c forming the hydrogen passage 15 is connected with the reformer 3, and the channel 25c forming the air passage 17 is connected with the air pump 13. Accordingly, the rich hydrogen gas generated in the reformer 3 and the air pumped by the pump 13 are supplied to the input end plate 27a through the hydrogen passage 15 and the air passage 17. In an embodiment shown in FIG. 4, the rich hydrogen gas and the air are supplied to the input end plate on opposite sides of a unit cell to allow the rich hydrogen gas to flow counter to the air. Any remaining hydrogen gas and air exhausts at the output end plate 27b. The hydrogen and air inputs and outputs of each unit cell in a stack are interconnected to the respective common input and output ports of the input and output end plates.

The width Wr of ribs 23b, 25b and the width Wc of channels 23c, 25c may affect the rate at which hydrogen gas and air flow through the passages 15, 17. Accordingly, the cross section A will be determined by the width Wc and height Hc of the passages 15, 17 forming channels 23c, 25c. When the width Wr of ribs 23b, 25b or the width Wc of channels 23c, 25c is not constant, an average value may be used.

Also, the passage is divided into a membrane portion 15b, 17b and a gas portion 15c, 17c. The gas portions 15c, 17c act to allow the hydrogen gas and oxygen gas to supply the active area 21a of the MEA 21, and the membrane portions 15b, 17b act to allow water generated by the reaction with these two gases in the stack 7 to flow. Accordingly, the hydrogen and oxygen gas are supplied through the cross section of the passages 15, 17 except at the cross section corresponding to the membrane portions 15b, 17b, that is, at the cross section of the gas portions 15c, 17c.

To enhance the efficiency of a fuel cell, it is desired that the contact resistance of current occurring in the stack be maintained within an allowable range. It is further desired that the gas diffusing layers of the MEA 21 have increased hydrogen or oxygen gas diffusing performance and reduced pressure drop across the stack. To achieve these goals, the cross section A of passages 15, 17, that is, the channels 23c, 25c of separators 23, 25 should be appropriately controlled.

In this embodiment, the ratio of the width of a channel to the width of a rib forming the passage for supplying fuel and air, the ratio of the width Wc thereof to the height Hc of the channels 23c, 25c, and the number of the passages are optimized to achieve these aims.

Table 2 illustrates the relation of the RPD with the combination of the width Wc of a channel 23c, the ratio of the width Wc of the channels 23c, 25c to the width Wr of the ribs 23b, 25b, the ratio of the width Wc thereof to the height Hc of the channels 23c, 25c and the number of the channels.

TABLE 2

|  | First embodiment | Second embodiment | Third embodiment |
| --- | --- | --- | --- |
| The width of a channel (mm) | 0.9~1.1 | 1.1~1.3 | 1.1~1.3 |
| The ratio (Wc/Wr) of a width Wc of the channel to a width Wr of the rib | 1.1~1.3 | 0.7~0.9 | 1.1~1.3 |
| The ratio(Wc/Hc) of width Wc thereof to height Hc of a channel | 0.6~0.8 | 0.6~0.8 | 0.6~0.8 |
| the number of channels | 3 | 5 | 4 |
| RPD(mW/cm$^2$) | 210 | 259 | 232 |

In order to estimate the performance of the fuel cell, after the hydrogen gas is supplied to the anode electrode 29 and the oxygen gas is supplied to the cathode electrode 31 in a non-heated state, the RPD is calculated whenever the combination of the width Wc of a channel 23c, the ratio of the width Wc of the channels 23c, 25c to a width Wr of the ribs 23b, 25b, the ratio of the width Wc thereof to the height Hc of the channels 23c, 25c, and the number of the channels are changed.

Referring to Table 2, it can be seen that the performance of the fuel cell is excellent when the above conditions are combined according to the second and third embodiments.

Particularly, it can be seen that the performance of the fuel cell according to the second embodiment is most excellent when the ratio Wc/Hc of the width Wc thereof to the height Hc of a channel is in the range from 0.6 to 0.8.

The reason that the ratio Wc/Hc of the width Wc thereof to the height Hc of a channel is in the range from 0.6 to 0.8 is as follows. If the ratio Wc/Hc is below 0.6, the width Wc of a channel is so much smaller than the height Hc of a channel so that a shape of the channels 23c, 25c is formed into a rectangle that has a smaller width and a longer length compared to other rectangles having the same cross section. This is problematic in that the pressure drop in the stack 7 increases. Also, if the ratio Wc/Hc is above 0.8, the height Hc of a channel is so much smaller than the width Wc of a channel so that the shape of the channels 23c, 25c is formed into a rectangle that has a larger width and a shorter length compared to other rectangles having the same cross section. This is problematic in that the pressure drop in the stack 7 increases. As a result, if the ratio Wc/Hc is below 0.6 or above 0.8, the pressure drop in the stack 7 increases so that the electric force desired to supply the hydrogen and oxygen gas is larger than electric force generated in the stack, thereby reducing the RPD.

Referring again to Table 2, it can be seen that when the second embodiment is compared with the third embodiment, the width Wc of the channel of the range from 1.1 to 1.3 is the same and the number of channels is one more in the separators 23, 25 of the same size so that the cross section of the passages 15, 17 becomes larger to reduce a pressure drop and to increase the efficiency of the fuel cell.

In addition, it can be seen that when the second embodiment is compared with the first embodiment, the width Wc of the channel and the number of channels are greater in the separators 23, 25 of the same size so that the cross section of the passages 15, 17 become larger to reduce a pressure drop and to increase the efficiency of the fuel cell.

In the first embodiment, although the RPD is lower than that in the second embodiment, it is advantageous that the exterior environment has a lesser affect on the supply condition of the hydrogen gas and air. Accordingly, the first embodiment is useful where the exterior environments are often varied.

Also, in the third embodiment, it is advantageous that the value of RPD is relative high compared to the first embodiment and the exterior environment has a lesser affect on the supply condition of the hydrogen gas and air as compared to the first embodiment.

As discussed above, the fuel cell system described above has a structure to enable the ratio of the width of a channel to a width of a rib forming the passage for supplying fuel and air, the ratio of the width thereof to the height of a channel, and the number of passages to be optimized such that the contact resistance of current occurring in the stack is maintained within an allowable range, the fuel diffusing performance is increased, and the pressure drop therein is reduced, thereby improving the thermal efficiency of the entire system.

Although embodiments of the present invention have been described in detail hereinabove in connection with certain embodiments, it should be understood that the invention is not limited to the disclosed embodiments, but, on the contrary is intended to cover various modifications and/or equivalent arrangements included within the spirit and scope of the present invention, as defined in the appended claims.

What is claimed is:

1. A fuel cell system comprising:
   at least one stack for generating electrical energy by an electrochemical reaction between hydrogen and oxygen;
   a fuel supply portion for supplying fuel to the stack; and
   an oxygen supply portion for supplying oxygen to the stack,
   wherein the stack comprises a plurality of membrane electrode assemblies separated by separators, the separators having first portions contacting an adjacent membrane electrode assembly and second portions spaced from an adjacent membrane electrode assembly to define passages through which the oxygen and hydrogen gas flow, each passage defining a height and a width,
   wherein the ratio of the width to the height of each passage is from 0.6 to 0.8, wherein the first portions are ribs projecting from each separator and the second portions are channels between neighboring ribs, wherein the width of each channel is from about 0.9 to about 1.1 mm, and a ratio of the width of each channel to a width of each rib is from about 1.1 to about 1.3, and wherein each separator comprises three channels.

2. A fuel cell system comprising:
   at least one stack for generating electrical energy by an electrochemical reaction between hydrogen and oxygen;
   a fuel supply portion for supplying fuel to the stack; and
   an oxygen supply portion for supplying oxygen to the stack,
   wherein the stack comprises a plurality of membrane electrode assemblies separated by separators, the separators having first portions contacting an adjacent membrane electrode assembly and second portions spaced from an adjacent membrane electrode assembly to define passages through which the oxygen and hydrogen gas flow, each passage defining a height and a width,
   wherein the ratio of the width to the height of each passage is from 0.6 to 0.8, wherein the first portions are ribs projecting from each separator and the second portions are channels between neighboring ribs, wherein the width of each channel is from about 1.1 to about 1.3 mm, and a ratio of the width of each channel to a width of each rib is from about 0.7 to about 0.9, and wherein each separator comprises five channels.

3. A fuel cell system comprising:
   at least one stack for generating electrical energy by an electrochemical reaction between hydrogen and oxygen;
   a fuel supply portion for supplying fuel to the stack; and
   an oxygen supply portion for supplying oxygen to the stack,
   wherein the stack comprises a plurality of membrane electrode assemblies separated by separators, the separators having first portions contacting an adjacent membrane electrode assembly and second portions spaced from an adjacent membrane electrode assembly to define passages through which the oxygen and hydrogen gas flow, each passage defining a height and a width,
   wherein the ratio of the width to the height of each passage is from 0.6 to 0.8, wherein the first portions are ribs projecting from the separator and the second portions are channels between neighboring ribs, wherein the width of each channel is from about 1.1 to about 1.3 mm, and a ratio of the width of each channel to a width of each rib is from about 1.1 to about 1.3, and wherein each separator comprises four channels.

* * * * *